United States Patent [19]

Alban

[11] 4,165,403
[45] Aug. 21, 1979

[54] ARTICLE EMPLOYING INTER-LEAVED ELASTIC LAYERS AND INELASTIC SHEETS

[76] Inventor: Clarence F. Alban, 197 Breezeway, Brighton, Mich. 48116

[21] Appl. No.: 493,533

[22] Filed: Aug. 1, 1974

Related U.S. Application Data

[62] Division of Ser. No. 360,771, May 16, 1973, Pat. No. 3,842,885.

[51] Int. Cl.² .............. B60C 11/00; B60C 27/00; B60C 5/00; B32B 3/10
[52] U.S. Cl. .................... 428/140; 428/138; 428/139; 152/361 R; 152/208
[58] Field of Search .............. 161/113, 114, 115; 428/138, 139, 140; 165/168–170; 152/354, 355, 357, 358, 361, 208; 74/232

[56] References Cited

U.S. PATENT DOCUMENTS

| 665,931 | 1/1901 | Pratt | 428/140 |
|---|---|---|---|
| 1,074,775 | 10/1913 | Cornwall | 428/140 |
| 1,330,756 | 2/1920 | Brown | 152/361 R |
| 1,428,726 | 9/1922 | Warth | 152/200 |
| 2,003,494 | 6/1935 | Reynolds | 161/114 |
| 2,715,089 | 8/1955 | Michener et al. | 428/140 |
| 3,507,739 | 4/1970 | Jacobs | 116/114 |

FOREIGN PATENT DOCUMENTS

| 685270 | 7/1930 | France | 152/354 |
|---|---|---|---|
| 691581 | 10/1930 | France | 428/140 |
| 895658 | 1/1945 | France | 152/200 |
| 259648 | 7/1928 | Italy | 428/140 |
| 963958 | 7/1964 | United Kingdom | 428/138 |

Primary Examiner—George F. Lesmes
Assistant Examiner—Daniel R. Zirker
Attorney, Agent, or Firm—Duckworth, Hobby, Allen & Pettis

[57] ABSTRACT

A pneumatic tire includes a breaker belt interposed between the tread and the tire carcass, the belt including opposing elastic layers with a sheet interposed between the layers, the sheet having a plurality of perforations therein and comprising a material having a relatively high modulus of elasticity with respect to the layers.

16 Claims, 6 Drawing Figures

ARTICLE EMPLOYING INTER-LEAVED ELASTIC LAYERS AND INELASTIC SHEETS

This application is a division of application Ser. No. 360,771, filed on May 16, 1973, now U.S. Pat. No. 3,842,885 issued Oct. 22, 1974.

BACKGROUND OF THE INVENTION

1. Field of the Invention

The present invention relates to structurally reinforced elastomeric articles, and in particular relates to such articles as employed as breaker belts for pneumatic tires.

2. Description of the Prior Art

A. Structurally Reinforced Elastomeric Articles

A variety of structurally reinforced elastomeric articles are taught in the prior art. For example, Reynolds in U.S. Pat. No. 2,003,494, teaches an insulating and packing laminate of a metal foil having holes therein and an elastic layer binding to the foil through the holes. Similar structural arrangements are taught by Beals in U.S. Pat. No. 84,932 and in British Pat. Nos. 786,233 and 450,151 to be useful as rubber matting. Kilduff teaches a somewhat related structure employed as an electrically conductive adhesive tape; see U.S. Pat. No. 3,505,144.

Newell in U.S. Pat. No. 2,747,701, discloses a reinforced brake lining comprising a wire mesh embedded in a standard brake liner composition. U.S. Pat. No. 2,304,263 to Loty teaches a wire mesh having opposing adhesive coatings thereon, as useful for laminating plywood together.

B. Breaker Belts for Pneumatic Tires

In the tire industry, it is standard practice to insert a reinforcing belt between the tread layer and the carcass, in order to prolong the useful tread life. These belts are generally made up of one or more layers of parallel strands of inextensible cords, for example steel wires, each embedded in an elastomeric material such as rubber, and running in a complete circle or in a helix around the tire. These belts do indeed prolong the life of a tire tread compared to that of beltless tires, primarily because of the rigidity of the breaker belts employed. This rigidity minimizes the drag that accompanies the forward and reverse directions of the vehicle, which drag is the principal cause of tread wear. Examples of such breaker belt construction are disclosed in the following U.S. patents: U.S. Pat. Nos. 3,195,602 to Keefe; 3,335,777 to Hutch; 3,095,026 to Weber; 3,637,003 to Clapson; 3,172,445 to Boussu et al; 3,667,529 to Mirtain; and 3,192,984 to Bourdon.

Additional prior art patents teaching other breaker belt arrangements include: U.S. Pat. Nos. 3,532,150 to Wittneben; 3,500,889 and 3,500,890 to Boileau; 3,667,529 to Mirtain; 3,205,931 to Keefe; 3,623,527 to O'Neil; 3,480,065 to Verdier; 3,509,929 to Delobelle; 3,231,000 to Massoubre; 3,558,389 to Bezbatchenko; 3,090,417 to Spelman; 3,253,635 to Travers; 2,792,868 to Benson; and 3,643,723 to Mukao. This list is not complete.

C. Radio Frequency Conductive Heating in the Manufacture of Pneumatic Tires

Pneumatic tires employing steel cord construction have been manufactured by radio frequency inductive heating of the elastomeric material causing bonding to the steel cord. Mittlemann, in U.S. Pat. No. 2,545,370 teaches the use of two radio frequency inductive heaters as used in the manufacture of rubber coated steel belts. Other inductive heating techniques are disclosed in the article "Inductive Heating and Tempering" in the *METALS HANDBOOK* of the American Society of Metals, 7th Edition Supplement, August 15, 1955, on page 107.

SUMMARY OF THE INVENTION

The present invention contemplates an article of manufacture comprising opposing elastic layers with a sheet interposed between the layers, the sheet having a plurality of perforations therein and comprising a material having a relatively high modulus of elasticity with respect to the layers.

In a specific embodiment, this article is employed as a breaker belt for a pneumatic tire having a carcass and an elastic outer casing surrounding a portion of the carcass and including a tread about the periphery of the casing. The breaker belt is interposed between the tread and the carcass.

The present invention also contemplates a method for making the composite breaker belt. The method includes the step of providing opposing layers of an elastic material, interposing a sheet of a material having a relatively high modulus of elasticity with respect to the elastic layers, and providing the sheet with equidistantly spaced perforations. The layers and the sheet are prestressed, and thereafter heated and pressed to bond the layers together.

THE DRAWING

FIG. 1(*b*) is a cross-section of the article of FIG. 1(*a*).

Figure 1A:
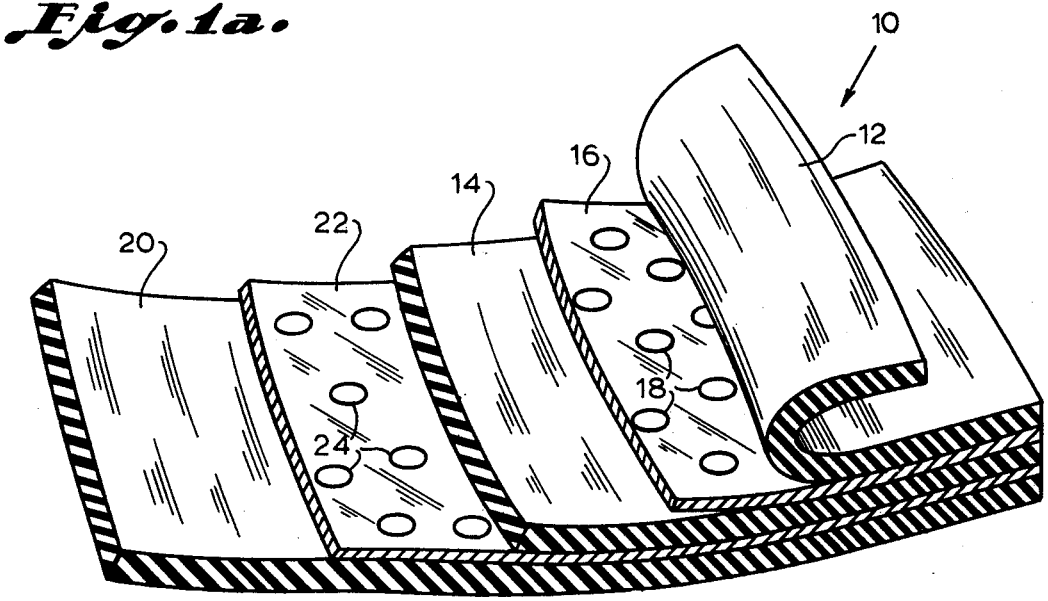
FIG. 1(*a*) is a perspective view of an article of manufacture in accordance with the present invention.
Figure 1B:
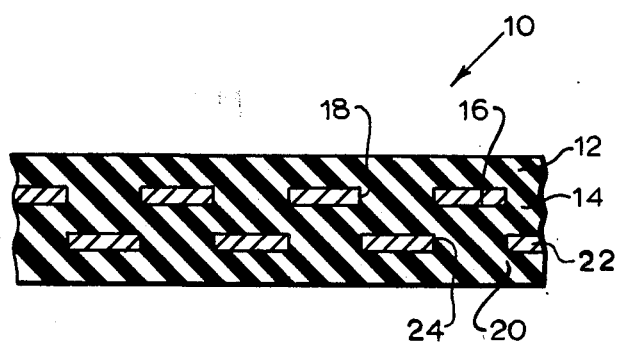
Figure 2:
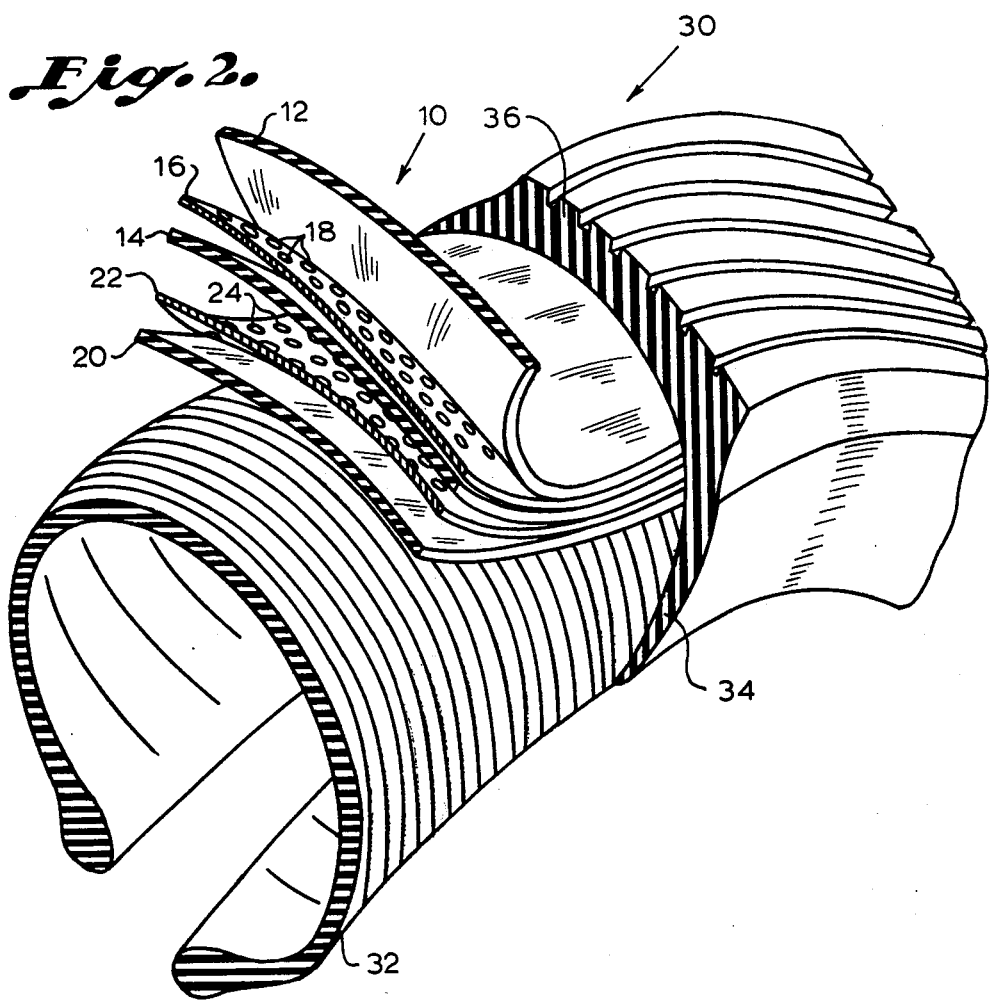
FIG. 2 is a perspective view of pneumatic tire employing a breaker belt as taught by the present invention.
Figure 3A:
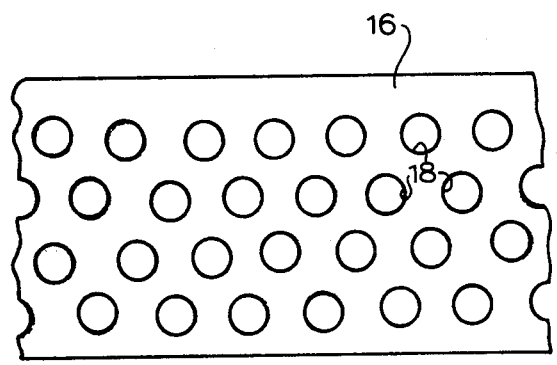
Figure 3B:
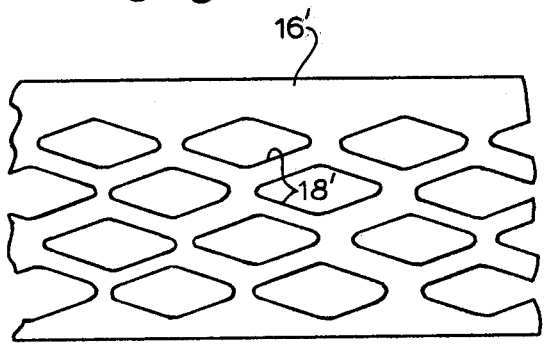

FIGS. 3(*a*) and 3(*b*) are top plan views of portions of the article of FIG. 1 and breaker belt of FIG. 2.

Figure 4:
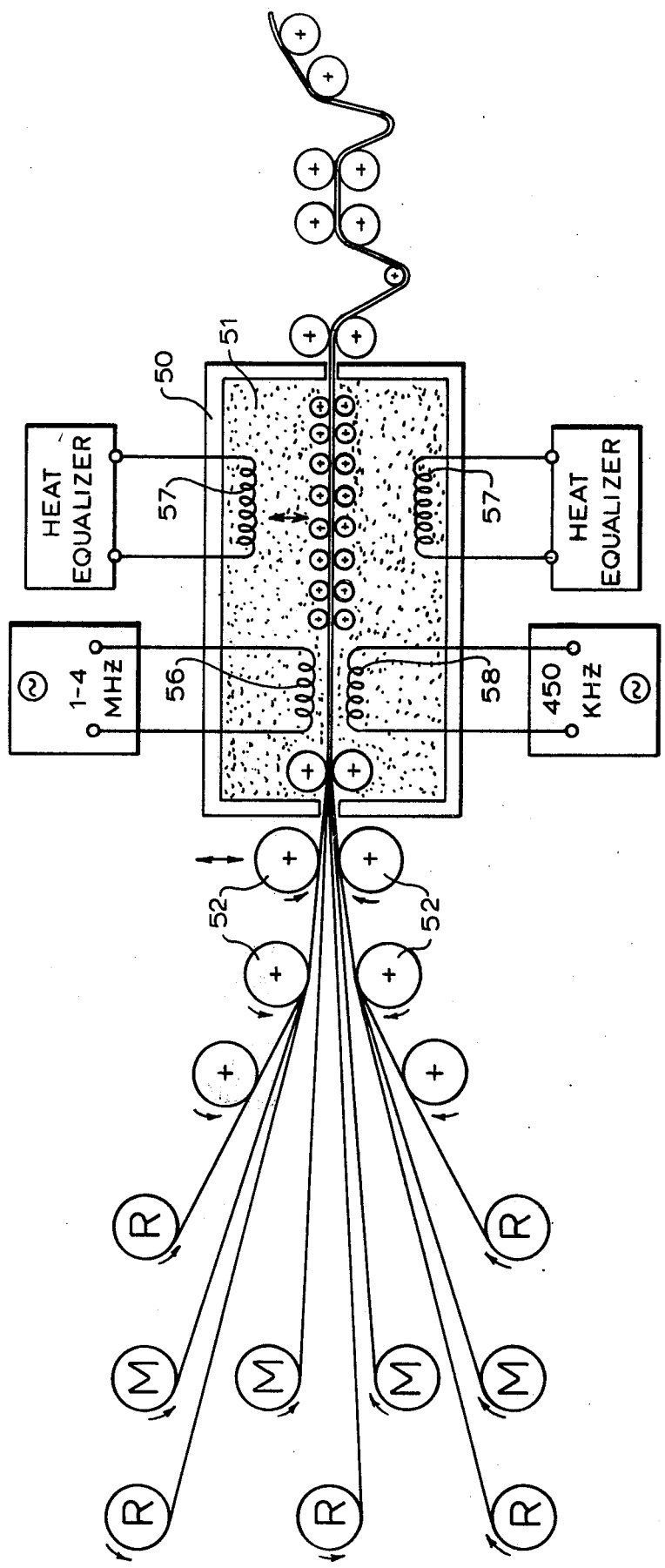

FIG. 4 is a side view, partially in cross-section and schematic, illustrating apparatus employed in manufacturing the article of FIG. 1 and the breaker belt of FIG. 2.

DETAILED DESCRIPTION

An embodiment of a structurally reinforced elastomeric article in accordance with the present invention as shown in FIGS. 1(*a*) and (*b*) and described with reference thereto.

The article, referred to generally as 10, comprises opposing first and second layers 12 and 14 of an elastomeric material. In this context, the term "elastomeric material" is intended to mean a material having a modulus of elasticity (Young's Modulus) varying between about several hundred to several thousand pounds per square inch, such as rubber for example.

A sheet 16 is interposed between the layers 12, 14. The sheet 16 has a plurality of equidistantly spaced perforations 18 therein, with the layers 12, 14 bonded together through the perforations, and with the layers bonded to the sheet. For example, the perforations 18 may be circular (note FIG. 3(*a*)) or diamond shaped (FIG. 3(*b*)), and suitably comprise on the order of fifty percent (50%) of the area of the sheet 16. The edges 17 of the sheet 16 are selvaged, i.e., free of the perforations 18. The sheet 16 comprises a material having a relatively high modulus of elasticity with respect to the layers 12, 14. In this regard, "relatively high modulus of elasticity" is intended to mean that the sheet 16 has a modulus of elasticity which is about one order of magnitude (times 10) and preferably several orders of magnitude greater than that of the layers 12, 14. For example, various metals such as stainless steel and aluminum are suitable.

In accordance with the present invention, the ratio of the thickness of the elastic layers 12, 14 to the thickness of the sheet 16 is given by expression (1) below:

$$t_1/t_2 \simeq \sqrt{E_2/E_1} \quad (1)$$

where:
$t_1$ = the composite thickness of the layers
$t_2$ = the thickness of the sheet
$E_1$ = modulus of elasticity for the layers
$E_2$ = modulus of elasticity for the sheet.

With this relationship between the thickness of the layers 12, 14 and the sheet 16, a uniform bending moment is obtained for the composite article 10. The "approximate" symbol is included in expression (1) above for the reason that, as will be appreciated by those skilled in the art, it is difficult to maintain a precise thickness ratio with the materials used for the layers 12, 14 and the sheet 16. Suitably, however, this ratio approximates the above expression as closely as possible, and preferably is maintained within ±20% of that expression. It is assumed that this ratio is determined at room temperature, it being well known that the modulus elasticity of many materials varies greatly with temperature. Specific examples employing this relationship are set out below.

As illustrated in FIGS. 1(a) and (b), the reinforced elastomeric article 10 may further comprise an additional elastic layer 20 and another sheet 22 having a relatively high modulus of elasticity interposed between the additional layer 20 and one of the opposing layers 14. The other sheet 22 also includes perforations 24 therein, with the additional layer 20 and the one opposed layer 14 bonded together through the perforations 24. Preferably, the perforations 24 of the other sheet 22 are out of register with the perforations 18 of the one sheet 16. (note FIG. 1(b)). The sheets 16,22 may comprise like or dissimilar metals, as is set forth in the examples below. The ratio of the composite thickness of all of the elastic layers 12, 14 and 20 to the composite thickness of the sheets 16, 20 22 is given by expression (2):

$$t_1/t_2 \simeq \sqrt{E_2/E_1} \quad (2)$$

$t_1$ = to the composite thickness of all of the elastic layers
$t_2$ = to the composite thickness of all of the sheets
$E_1$ = the modulus of elasticity for the layers
$E_2$ = the modulus of elasticity for the sheets.

The reinforced elastomeric structure of the article 10 of FIGS. 1(a) and (b) may be employed as conveyor belts, rubber matting, and similar uses where a relatively strong, elastic member is required. For example, a relatively high resistivity metal may be employed as the sheet, such that heat is generated by the passage of current through the sheet ($I^2R$). Such articles are useful as heated door mats, flooring, and a variety of other uses. In particular, however, the article of the present invention is useful as a breaker belt for pneumatic tires as is described in greater detail with reference to FIG. 2.

As shown in FIG. 2, a pneumatic tire, referred to generally as 30, comprises a carcass 32 having an elastic outer casing 34 surrounding a portion of the carcass and including a tread 36 about the periphery of the casing.

In accordance with the present invention, a breaker belt 10 identical in structure to the reinforced elastomeric structure 10 of FIG. 1 is interposed between the tread 36 and the carcass 32. As shown in FIG. 2, the breaker belt 10 also includes opposing elastic layers 12, 14 and 20 with sheets 16, 22 interposed between adjacent layers and having perforations 18, 24 in the respective sheets, with the layers bonded together through the perforations and to the sheets. The breaker belt 10 is substantially wider than the width of the tread 36; for example, the breaker belt 10 is at least about 10% wider than the tread. The ratio of the composite thickness of the elastic layers 12, 14 and 20 to the thickness of the sheets 16, 22, is given by expression (2) above.

Specific breaker belt examples in accordance with the present invention are set out next.

EXAMPLE 1

In this example, the composite breaker belt includes two layers of an automobile tire grade rubber having a modulus of elasticity on the order of 2,000 lbs. per square inch, the belt further including a sheet comprising a heat treatable 17-7 PH grade stainless steel having a composition of 16.5 percent chromium, 4.25 percent nickel, 3.60 percent copper, and 0.25 percent columbium. Copper is included to augment bonding between the rubber layers and the steel sheet. This stainless steel has a modulus of elasticity of about $28.7 \times 10^6$ pounds per square inch at room temperature. With 50% of the sheet voided due to the perforations, the effective modulus of elasticity becomes one-half, or about $14.35 \times 10^6$ pounds per square inch.

In this example, the thickness of the stainless steel sheet is arbitrarily selected at 0.005 inches (5 mils). Applying expression (1) above, the composite thickness of the two rubber layers is given as 0.423 inches. While it is feasible to divide this composite layer thickness between the two rubber layers (0.212 inches per rubber layer, separated by the 0.005 inch stainless steel sheet), it is preferable for use as a breaker belt to proportion two-thirds of the composition thickness to the outer layer adjacent the tire tread and one-third to the inner layer adjacent the tire carcass. Thus, the outer layer has a 0.282 inch thickness and the inner layer a 0.141 thickness, separated by the 0.005 inch thick stainless steel sheet.

EXAMPLE 2

In this example, the materials set forth in Example 1 are employed, the breaker belt further including an additional rubber layer and another stainless steel sheet as shown in FIG. 2. The thickness of the stainless steel sheets are again arbitrarily selected at 0.005 inches each, with a composite sheet thickness, $t_2$, of 0.010 inches. Employing expression (2) above, the composite thickness of all three rubber layers is 0.847 inches or 0.282 inches per layer.

EXAMPLE 3

In this example, the two layers of a tire grade rubber are again employed with a single sheet comprising an aluminum foil having a modulus of elasticity of about $10.30 \times 10^6$ pounds per square inch or about $3.15 \times 10^6$ pounds per square inch with 50% perforations therein. Selecting a 0.010 inch aluminum thickness for the aluminum sheet and utilizing expression (1) above, the composite thickness of the two rubber layers is computed at 0.254 inches each; or 0.169 inches for the layer adjacent the carcass and 0.338 inches for the outer layer adjacent the tread, when employing the one-third/two-third relationship set forth in Example 1 above.

EXAMPLE 4

Three rubber layers and two metallic sheets are employed in this example, one of the sheets comprising the stainless steel of Examples 1 and 2, and the other sheet comprising the aluminum of Example 3. Selecting a thickness for the steel sheet and aluminum as 0.003 inches and applying expression (1) above for each, the composite thickness of the rubber layers on opposing sides of the stainless steel is computed at 0.152 inches, or 0.076 inches per layer. Likewise, the composite thickness of the rubber layers on opposing sides of the aluminum is 0.254 inches, or 0.125 inches for each layer. In order to obtain a proper match of elasticity modulii, it is desirable to dimension the center rubber layer between the steel and aluminum sheets such as to have a thickness corresponding to the total of that required to match the modulus of both the stainless steel and aluminum sheets. Thus, in this example, the breaker belt has a construction of a first rubber layer-steel sheet-second rubber layer-aluminum sheet-third rubber layer, these portions being dimensioned as follows:

| | | |
|---|---|---|
| First rubber layer | 0.076 inches | |
| Stainless steel sheet | 0.003 inches | |
| Second rubber layer | 0.203 inches | |
| Aluminum sheet | 0.003 inches | |
| Third rubber layer | 0.127 inches | |
| Total | 0.412 inches | |

EXAMPLE 5

In this example, two rubber layers and a sheet of spring steel are employed. For purposes of this example, a more brittle rubber having a modulus of elasticity of 3000 pounds per square inch is utilized. The spring steel comprises a 0.78% carbon steel having a modulus of $10 \times 10^6$ pounds per square inch with 50% voids. Selecting a sheet thickness of 0.006 inches for the steel and applying expression (1), the total rubber thickness is determined to be 0.283 inches, or 0.141 inches per rubber layer.

A method of making the reinforced structure 10 will now be described with reference to FIG. 4. As shown, a plurality of material rolls are provided, some of which have rubber layers R mounted thereon, and the other rolls having metal sheets M thereon. The rubber layer rolls R and the metal sheet rolls M are juxtaposed such that the metal sheets are drawn between opposing rubber layers. As noted with reference to FIG. 1, the metal sheets have a plurality of perforations therein. The thickness of the rubber layers and metal sheets on the rolls R and M respectively are preselected according to the criteria discussed above.

The apparatus comprises a heating, bonding and cooling chamber 50 and means, including outer rollers 52 and rollers 54 within the chamber for drawing and pressing the rubber layers and metal sheets through the chamber. Selected ones of the outer rollers 52 are adjustable in a vertical direction, as shown by arrows in FIG. 4. Included with the chamber 50 are two radio frequency induction coils 56 and 58. In accordance with the present invention, one of the coils 56 is adapted to operate at a resonant frequency of the rubber layers; i.e., at between 1 to 4 megahertz. The second coil 58 is adapted to operate at about 450 kilohertz, which is about the resonant heating frequency of stainless steel. It will be understood that these frequencies can be adjusted as required dependent upon the materials employed. Suitably, a protective atmosphere 51, such as nitrogen, is maintained in the chamber 50. Heat equalizing coils 57 provide a uniform work temperature of the laminate after being heated by the coils 56, 58.

In operation, the inner rollers 54 pull the rubber layers and metal sheets into the bonder 50, while the outer rollers 52 control the pre-stress on the composite layers and sheets sufficiently to achieve a degree of back tension to assure that the rubber layers and metal sheets enter the bonder 50 in a prestressed state. The amount of pre-stress is controlled by varying the vertical position of the outer rollers 52. The layers are heated by the respective heating coils 56, 58. Thereafter, the layers and sheets are pressed together by passing through the inner rollers 54 so as to bond the rubber layers together through the perforations, and to further bond the rubber layers to the metal sheets. Preferably, the inner rollers 54 are water cooled so as to cool the composite laminate during passage through the inner rollers, and are adjustable in a vertical direction so as to provide for variations in the pressure applied to the laminate.

I claim:
1. An article of manufacture comprising:
   opposing elastic layers;
   a sheet interposed between said layers, said sheet having a plurality of perforations therein and comprising a material having a relatively high modulus of elasticity with respect to said layers; and wherein
   the ratio of the thickness of said layers to the thickness of said sheet is given by

$$t_1/t_2 \simeq \sqrt{E_2}/E_1$$

where:
   $t_1$ = the composite thickness of said layers,
   $t_2$ = the thickness of said sheet,
   $E_1$ = modulus of elasticity for said layers,
   $E_2$ = modulus of elasticity for said sheet.
2. An article as recited in claim 1 with said layers bonded together through said perforations.
3. An article as recited in claim 2 wherein the area of said perforations is equal to on the order of fifty percent (50%) of the area of said sheet.
4. An article as recited in claim 3 wherein said perforations are of a generally circular shape.
5. An article as recited in claim 1 wherein said elastic layers consist essentially of a rubber-like composition and said sheet consists essentially of a metal.
6. An article as recited in claim 5 wherein said metal consists of a spring steel having on the order of 0.78% carbon content.
7. An article as recited in claim 5 wherein said metal comprises a stainless steel.
8. An article as recited in claim 7 wherein said stainless steel comprises a heat treatable 17-7P.H. grade stainless steel having a composition including about 3.6% copper.
9. An article as recited in claim 5 wherein said metal comprises aluminum.
10. An article as recited in claim 1 further comprising:

an additional one of said elastic layers; and another sheet having a relatively high modulus of elasticity and with perforations therein, interposed between said additional layer and one of said opposing layers.

11. An article as recited in claim 10 wherein the ratio of the thickness of said layers to the thickness of said sheets is given by $$t_1/t_2 \simeq \sqrt{E_2/E_1}$$

where:
- $t_1$ = the composite thickness of said layers,
- $t_2$ = the thickness of said sheets,
- $E_1$ = modulus of elasticity for said layers,
- $E_2$ = modulus of elasticity of said sheets.

12. An article as recited in claim 10 wherein said additional elastic layer is bonded to said one opposing layer through said perforations in said another sheet and to said sheet.

13. An article as recited in claim 10 wherein said sheets comprise a like metal.

14. An article as recited in claim 10 wherein said sheets comprise differing metals.

15. An article as recited in claim 14 wherein one of said sheets comprises stainless steel, and the other comprises aluminum.

16. An article as recited in claim 10 wherein said perforations of said another sheet are out of register with said perforations of said one sheet.

* * * * *